US008376462B2

(12) United States Patent
Marini et al.

(10) Patent No.: US 8,376,462 B2
(45) Date of Patent: Feb. 19, 2013

(54) AIRCRAFT SEAT WITH ADJUSTABLE ARMRESTS

(75) Inventors: Hector Noel Marini, Palm City, FL (US); Barry Oberly, Port St. Lucie, FL (US)

(73) Assignee: PAC Seating Systems, Inc., Palm City, FL (US)

( * ) Notice: Subject to any disclaimer, the term of this patent is extended or adjusted under 35 U.S.C. 154(b) by 0 days.

(21) Appl. No.: 12/577,106

(22) Filed: Oct. 9, 2009

(65) Prior Publication Data

US 2011/0084527 A1    Apr. 14, 2011

(51) Int. Cl.
*B60N 2/00* (2006.01)
*B60N 2/06* (2006.01)
*B60N 2/14* (2006.01)
*B60N 2/20* (2006.01)
*B60N 2/46* (2006.01)

(52) U.S. Cl. ......... 297/344.24; 297/411.26; 297/411.27; 297/411.37; 297/440.1; 297/440.14; 297/440.23

(58) Field of Classification Search ............. 297/344.24, 297/411.26, 411.27, 411.37, 440.1, 440.14, 297/440.15, 40.23
See application file for complete search history.

(56) References Cited

U.S. PATENT DOCUMENTS

| 3,622,202 | A | * | 11/1971 | Brown | 297/344.1 |
|---|---|---|---|---|---|
| 4,291,916 | A | | 9/1981 | Chardon | |
| 4,311,337 | A | * | 1/1982 | Brunn | 297/440.15 X |
| 4,588,226 | A | * | 5/1986 | Young et al. | 297/344.24 |
| 4,625,934 | A | | 12/1986 | Ryan et al. | |
| 4,671,572 | A | * | 6/1987 | Young et al. | 297/344.24 |
| 4,756,502 | A | * | 7/1988 | Egan | 248/425 |
| 5,419,617 | A | * | 5/1995 | Schultz | 297/411.27 |
| 5,551,757 | A | * | 9/1996 | Glover | 297/440.23 |
| 5,660,442 | A | * | 8/1997 | Tornero | 297/411.37 X |
| 5,738,414 | A | * | 4/1998 | Wieland et al. | 297/440.1 |
| 5,839,784 | A | * | 11/1998 | Breen | 297/411.37 X |
| 5,890,767 | A | * | 4/1999 | Chang | 297/440.14 |
| 5,944,387 | A | * | 8/1999 | Stumpf | 297/411.37 |
| 6,241,317 | B1 | * | 6/2001 | Wu | 297/440.23 |
| 6,367,880 | B1 | * | 4/2002 | Niederman et al. | 297/440.14 |
| 6,659,560 | B1 | * | 12/2003 | Chi | 297/411.37 X |
| 6,715,837 | B2 | * | 4/2004 | Niederman et al. | 297/440.14 |
| 6,758,450 | B2 | * | 7/2004 | Niederman et al. | 297/440.16 X |
| 7,140,690 | B2 | * | 11/2006 | White et al. | 297/440.14 |
| 7,188,908 | B2 | * | 3/2007 | White et al. | 297/440.14 |
| 7,252,339 | B2 | * | 8/2007 | Owens | 297/440.1 |
| 7,434,304 | B2 | * | 10/2008 | Owens | 29/525.01 |

(Continued)

FOREIGN PATENT DOCUMENTS

EP    585515 A1 *   3/1994  ............... 297/411.27

*Primary Examiner* — Rodney B White
(74) *Attorney, Agent, or Firm* — Troutman Sanders LLP

(57) ABSTRACT

An aircraft seat includes a seat bottom frame, a seat translation and rotation mechanism attached to the seat bottom frame allowing translation and rotational movement of the seat bottom frame. An armrest is removably attached to the side of the seat bottom frame, and can be set to different positions relative to the seat bottom. The armrest has a seat control mounted to an outside of the armrest, and an input transfer mechanism disposed inside the armrest. The input transfer mechanism has an end engaged to the seat control, and a receiver end. The input transfer mechanism is cableless. A couple shaft is engaged with the receiver end and engaged with the seat translation and rotation mechanism. When the seat control is actuated, the input transfer mechanism causes the seat translation and rotation mechanism to allow the seat bottom frame to at least one of translate and rotate.

4 Claims, 7 Drawing Sheets

U.S. PATENT DOCUMENTS

| | | | |
|---|---|---|---|
| 7,472,958 B2 * | 1/2009 | Sano et al. | 297/344.22 |
| 7,480,947 B2 * | 1/2009 | Patella | 297/440.23 X |
| 7,806,481 B2 * | 10/2010 | Eberlein | 297/411.37 |
| 2003/0057755 A1 * | 3/2003 | Brandt et al. | 297/344.24 |
| 2003/0189370 A1 * | 10/2003 | Hemmer et al. | 297/344.11 |
| 2007/0200415 A1 * | 8/2007 | Eberlein | 297/411.37 |
| 2009/0127908 A1 * | 5/2009 | Kucharski et al. | 297/344.24 |
| 2010/0123346 A1 * | 5/2010 | Lin | 297/411.37 |

* cited by examiner

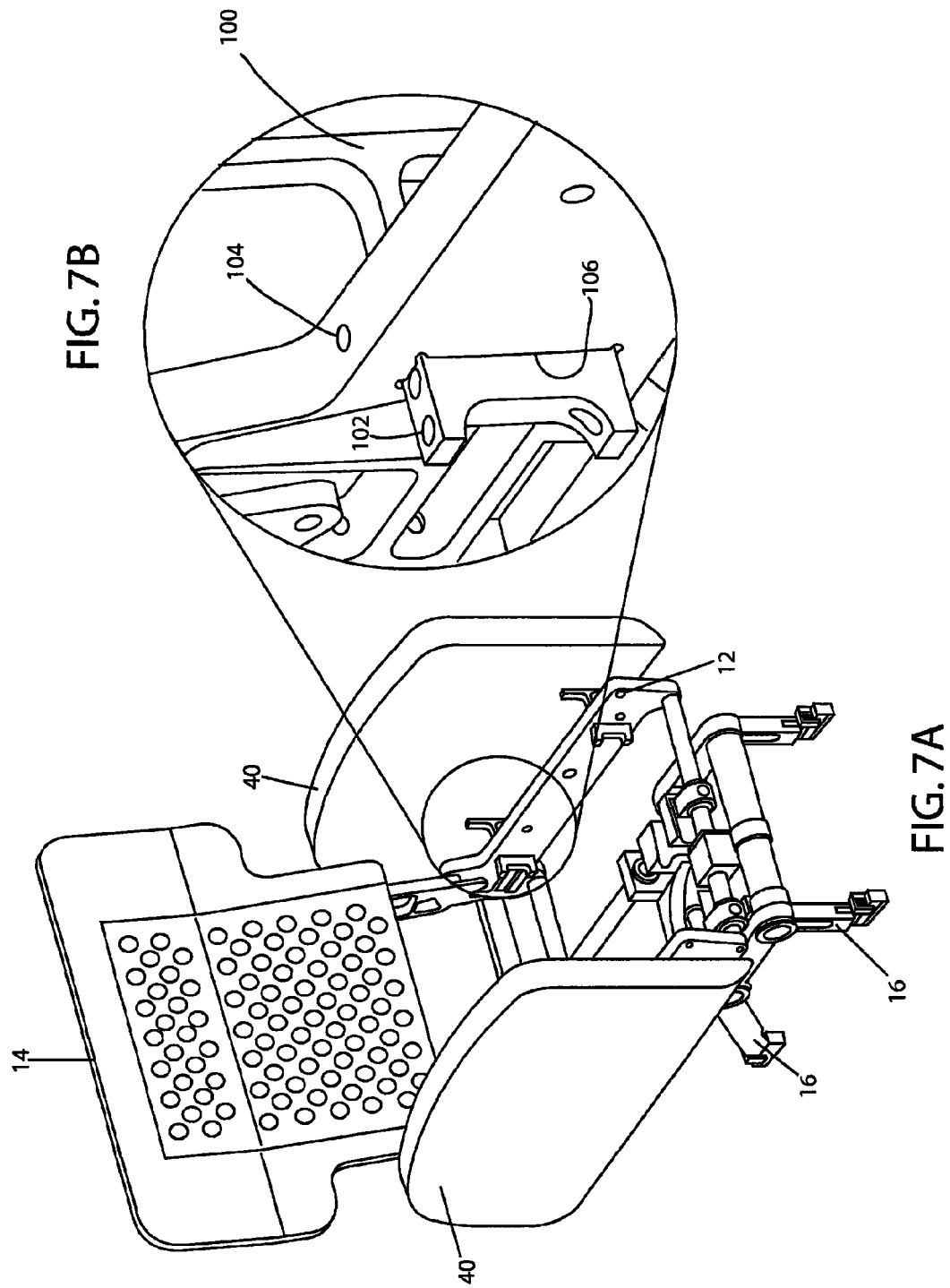

AIRCRAFT SEAT WITH ADJUSTABLE ARMRESTS

FIELD OF THE INVENTION

This invention relates to seating structures for aircraft. More particularly, the mechanism to adjust the seat position.

BACKGROUND OF THE INVENTION

Due to the unique environment in which they are used, aircraft seat structures must meet a number of requirements. For example, such seat structures must satisfy government requirements involving aircraft safety. In addition, such seat structures must meet relatively rigid weight guidelines in order to provide satisfactory economical operation of an airplane in which they are used while, at the same time, occupying a minimum of space and still providing maximum passenger comfort and convenience.

The typical mechanism to adjust either the seat back position or the seat position relative to both linear and rotational movement is located inside the armrest of the aircraft seat and transmits control information to the seat base and back to adjust the position of the seat. A user operated hand control is fixed on the outside and near the top of the arm rest. One or more control cables lead from the hand control, inside the armrest, and exit the lower portion of the armrest and continue to the seat base or the seat back to a series of cams and clutch plates to actuate the movement of the seat.

This configuration has many drawbacks. One main drawback is the seat assembly process. The aircraft seat frame is first assembled as well as the mechanical workings. The seat control system is fully assembled and tested. The seat is then dissembled for upholstering. This includes removing the armrests from the seat frame. Once the seat is reassembled after upholstering, the seat control system is out of alignment, and must be again configured to government and manufacturer specifications. Reconfiguring the seat control system is specialized work that is costly and time consuming. This is particularly so since the all of the components are now upholstered.

Certain seat control mechanisms avoid this issue by not embedding the control system inside the arm rest. U.S. Pat. No. 4,291,916 to Chardon. FIG. 3 illustrates sold linkage seat back control system, but the lever 34, is not inside an armrest, but attached directly to the seat base. While this solves certain issues, this seat is not used in typical commercial or private aircraft.

The present invention solves the problem of seat control systems in an armrest. Additionally, the present invention allows for adjustable armrest positions during seat assembly using identical parts and a modular design.

SUMMARY OF THE INVENTION

The present invention relates to an aircraft seat which includes a seat bottom frame having a side, a seat translation and rotation mechanism attached to the seat bottom frame which allows translation and rotational movement of the seat bottom frame. The seat also includes at least one armrest attached to the side of the seat bottom frame. The armrest can be removed and replaced, and set to different positions relative to the seat bottom. The armrest has a seat control mounted to an outside of the armrest, and an input transfer mechanism disposed inside the armrest. The input transfer mechanism has a seat control attachment end engaged to the seat control, and a receiver end. The input transfer mechanism does not use cables but a series of levers, cams and springs. A couple shaft is engaged on a first end with the receiver end of the input transfer mechanism and engaged on a second end with the seat translation and rotation mechanism. When the seat control is actuated, the input transfer mechanism causes the receiver end to rotate, the couple shaft transmits the rotation to the seat translation and rotation mechanism which allows the seat bottom frame to at least one of translate and rotate.

In a further embodiment, the input transfer mechanism includes a first control arm having the seat control attachment end and a second end. A second control arm is also includes having a third end and an opposing fourth end, wherein the third end is pivotally engaged with the second end of the first control arm. Further, a third control arm has the receiver end and a fifth end pivotally engaged with the fourth end of the second control arm, the fifth end is opposite the receiver end. When the seat control is actuated, the first, second, and third control arms are moved or pivoted to rotate the received end.

Another aircraft seat embodiment further has at least one armrest bracket disposed on the armrest, and the armrest bracket has a plurality of bracket holes. The also has a seat frame slot in the seat bottom frame configured to receive the armrest bracket. The seat frame slot has a seat frame hole. Also included is a fastener engaging the armrest bracket and the seat bottom frame by passing consecutively through the seat frame hole and one of the plurality of bracket holes to attach the armrest to the seat bottom frame.

An additional embodiment, the aircraft seat includes a seat back frame pivotally connected to a back of the seat bottom frame, and a seat back mechanism disposed in the seat bottom frame. Here, when the seat control is actuated, the input transfer mechanism causes the receiver end to rotate and the couple shaft transmits the rotation to the seat back mechanism, allowing the seat back frame to pivot.

In the above embodiment, the seat control can have all or some of a first position allowing only the translational movement, a second position allowing only the rotational movement and a third position allowing only the pivoting of the seat back frame. Here, depending on the control combination, even partial movements can have positions, i.e. rotation less than 360°. These positions are set by partial movements of the input transfer mechanism, each movement locking and unlocking the rotational, translational, and pivotal movements in a particular sequence.

An embodiment for an aircraft seat armrest includes at least one armrest bracket disposed on a bottom of the armrest, a seat control mounted to an outside of the armrest, and the input transfer mechanism disposed inside the armrest. The input transfer mechanism has a seat control attachment end engaged to the seat control, and a receiver end. The input transfer mechanism is cable-less and only uses a series of arms, cams, levers and springs. A couple shaft is engaged on a first end with the receiver end of the input transfer mechanism and is engaged on a second end with a seat translation and rotation mechanism. When the seat control is actuated, the input transfer mechanism causes the receiver end to rotate, the couple shaft transmits the rotation to the seat back mechanism and the seat translation and rotation mechanism allows the seat bottom frame to at least one of translate and rotate.

A further embodiment for an aircraft seat includes the seat bottom frame having a back and a side, a seat back frame pivotally connected to the back of the seat bottom frame, and a seat translation and rotation mechanism attached to the bottom frame. The mechanism allows translation and rotational movement of the seat bottom frame. The movements include front-to-back, side-to-side, and 360° rotation.

At least one armrest is capable of being attached and reattached to the side of the seat bottom frame. The armrest includes the seat control mounted to an outside of the armrest, and an input transfer mechanism disposed inside the armrest. The an input transfer mechanism has a seat control attachment end engaged to the seat control, and a receiver end. As above, the input transfer mechanism is cable-less. A couple shaft engages on its first end the receiver end of the input transfer mechanism and engages on its second end with a seat movement mechanism. In this embodiment, when the seat control is actuated, the input transfer mechanism causes the receiver end to rotate, the couple shaft transmits the rotation to the seat movement mechanism which allows at least one of the seat bottom frame to at least one of translate and rotate and the seat back frame to pivot.

BRIEF DESCRIPTION OF THE DRAWINGS

FIGS. 7A and 7B illustrate the width adjusting embodiment of the present invention, wherein FIG. 7B is a magnified section of FIG. 7A.

DETAILED DESCRIPTION OF THE INVENTION

An embodiment of the invention will be described herein below with reference to FIGS. 1-6.

An aircraft seat 10 includes a seat bottom frame 12 and a seat back frame 14. The seat bottom frame 12 includes a seat translation and rotation mechanism 15. The seat translation and rotation mechanism 15 allows the seat bottom frame 12 to move front and back and side to side and allows for seat rotation. The typical rotation permitted is 360°.

Figure 6:
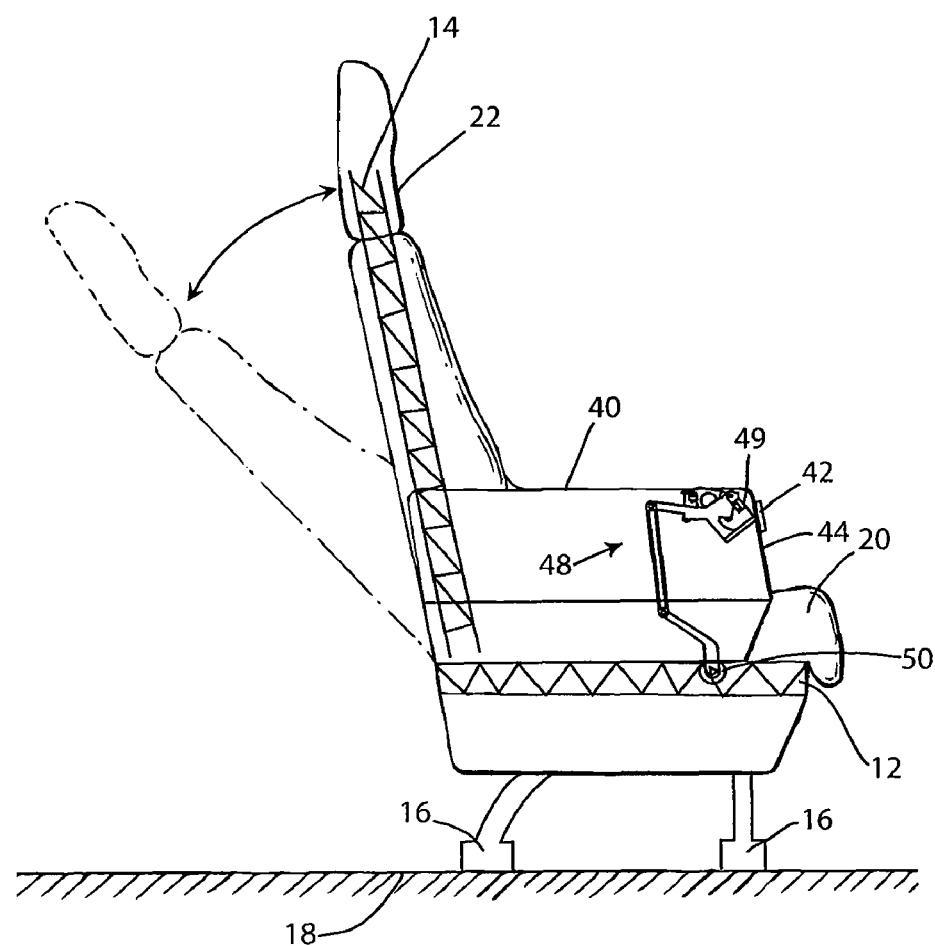
FIG. 6 is a partially cut-away left side view of an aircraft seat with the input transfer and disconnect mechanism of the present invention.

Further, the seat bottom frame 12 is attached, on a bottom side, to seat supports 16 which are fixed to the floor of an airplane fuselage 18. The seat back frame 14 is pivotally attached to one end of the seat bottom frame 12. The seat bottom frame 12 and the seat back frame 14 have generally square and rectangular configurations, respectively, and can be made from aluminum, light gauge steel, alloys, a strong light-weight plastic, or composites. Seat base 20 is located over the top side of seat bottom frame 12 and is upholstered and padded to be in contact with a passenger. The seat base 20 typically covers the seat bottom frame 12 and the seat translation and rotation mechanism 15. The seat back frame 14 is also upholstered to form a seat back 22. The seat back 22 can pivot from an upright position, to a reclined position, and back again, as illustrated in FIG. 6.

An aircraft seat 10 is also provided with a pair of arm rests 40. Both arm rests are typically permanently fixed to the seat bottom frame 12. On the outer surface of either armrest 40 is a user operated seat control 42. The seat control 42 can be mounted on the front edge 44 or on the inner surface 46 of the armrest 40. Further, the armrest 40 can include a seat reclining control 41.

When the seat control 42 is actuated, the seat translation and rotation mechanism 15 is unlocked and translational and rotational movement of the seat bottom 12 is allowed. The user shifts her weight accordingly to move the seat into the desired position. Further, when the seat reclining control 41 is actuated, the seat back 22 is unlocked and can be pivoted back into a more reclining position by the weight of the user. When the seat reclining control 41 is actuated and the user's weight is not against the seat back 22, the seat back 22 returns to the upright position. Actuation of the seat control 42 and the seat reclining control 41 can be by a positive pressure against the seat reclining control 41/the seat control 42 or by pulling an edge of the seat reclining control 41/the seat control 42, depending on the configuration.

Figure 1:
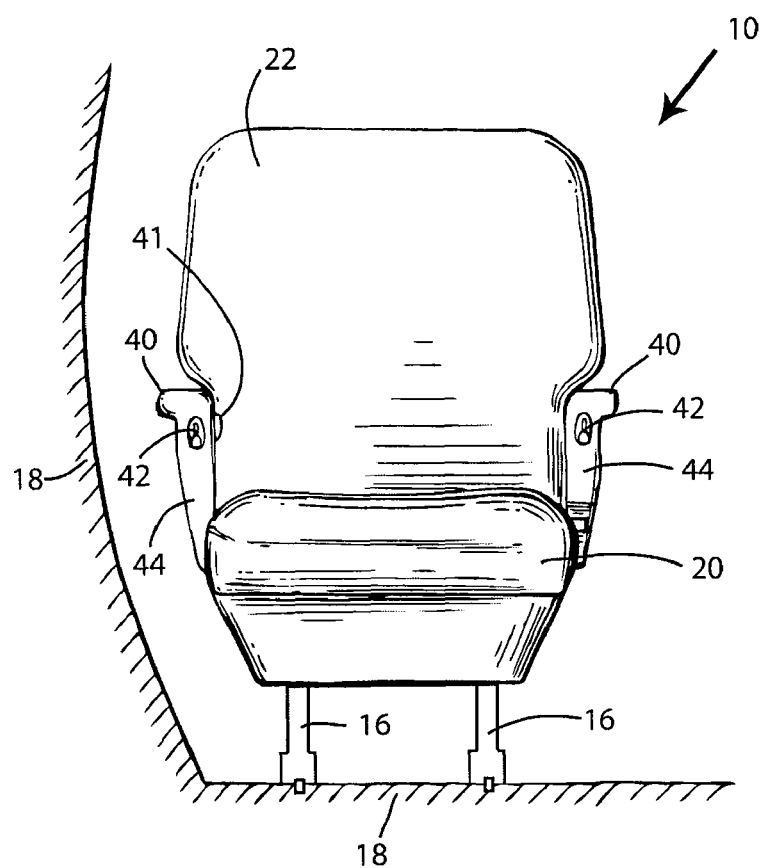
FIG. 1 is a front view of an aircraft seat with the input transfer and disconnect mechanism of the present invention.
Figure 2:
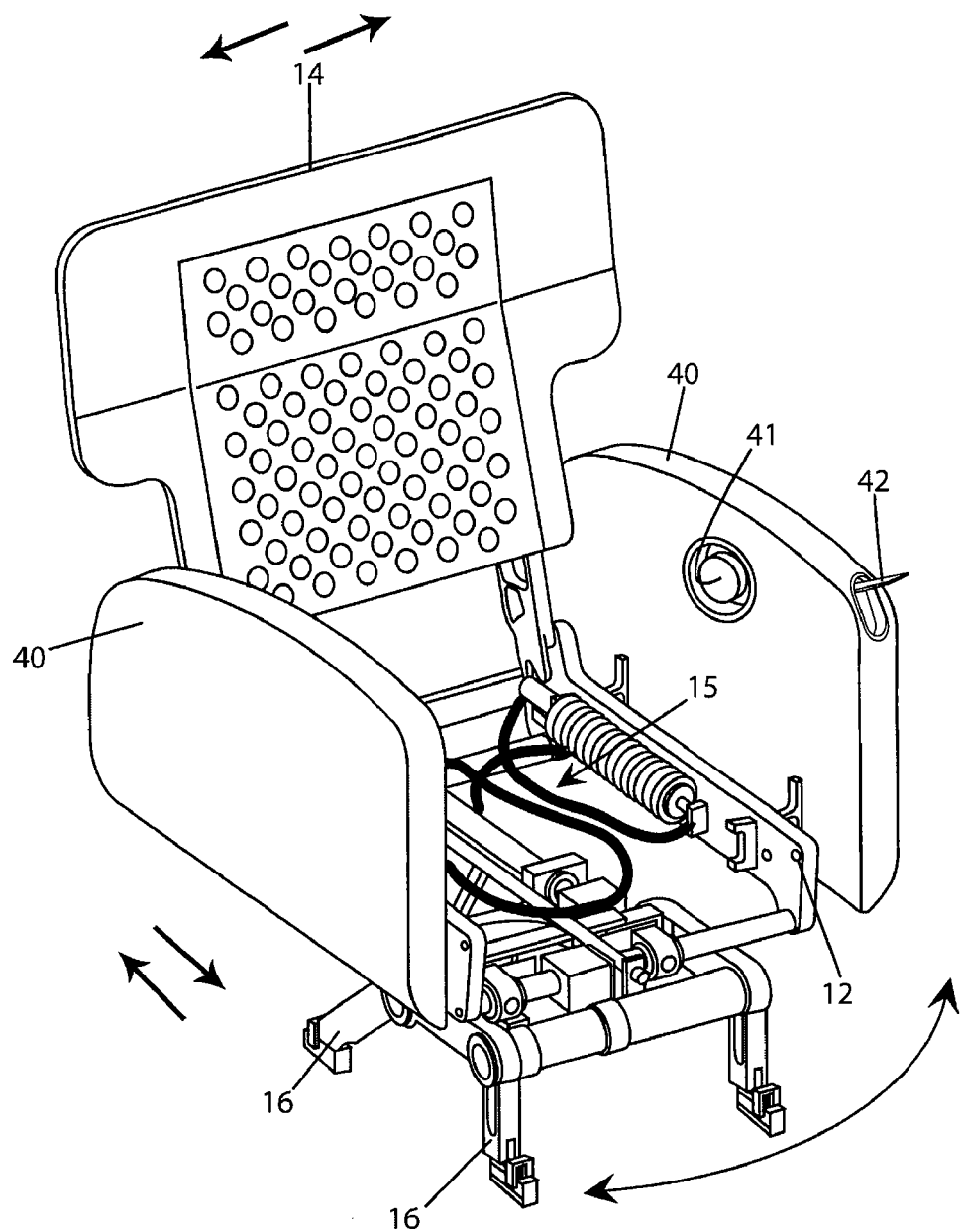
FIG. 2 is an non-upholstered top-front-left side perspective view of an aircraft seat of the present invention.
Figure 3:
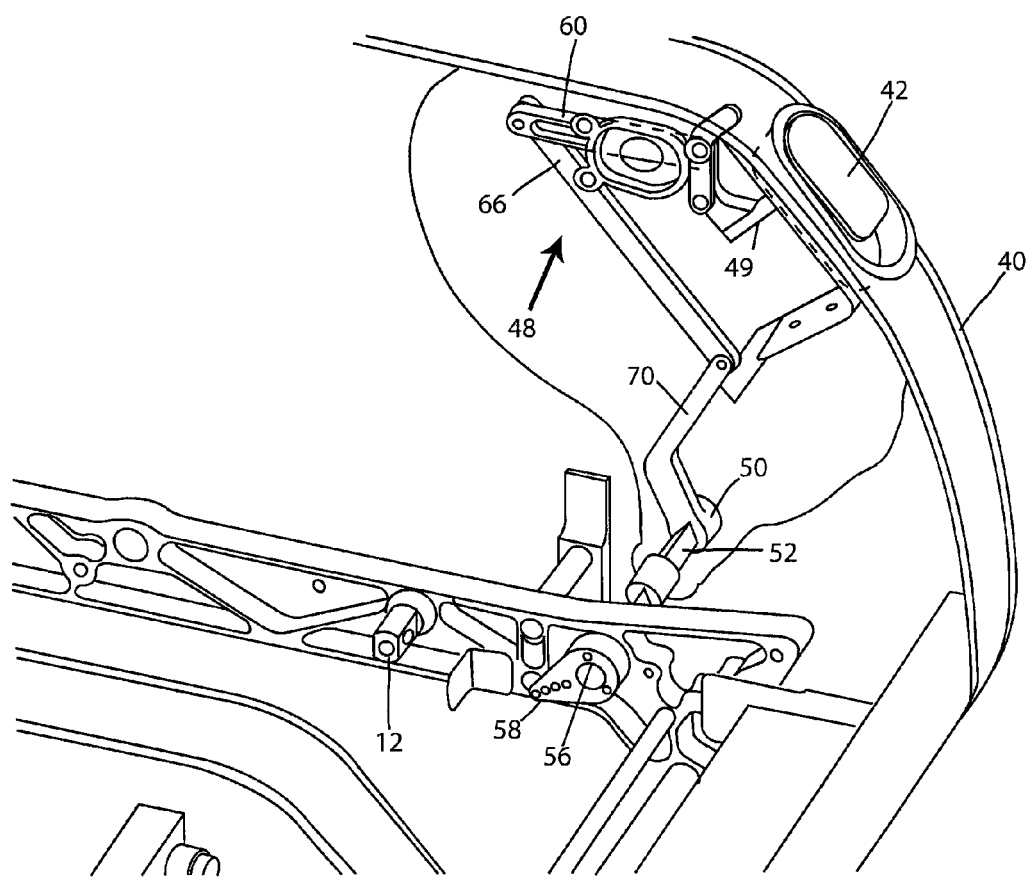
FIG. 3 is a partially cut-away top-right perspective view of an aircraft seat with the input transfer and disconnect mechanism of the present invention.
Figure 4:
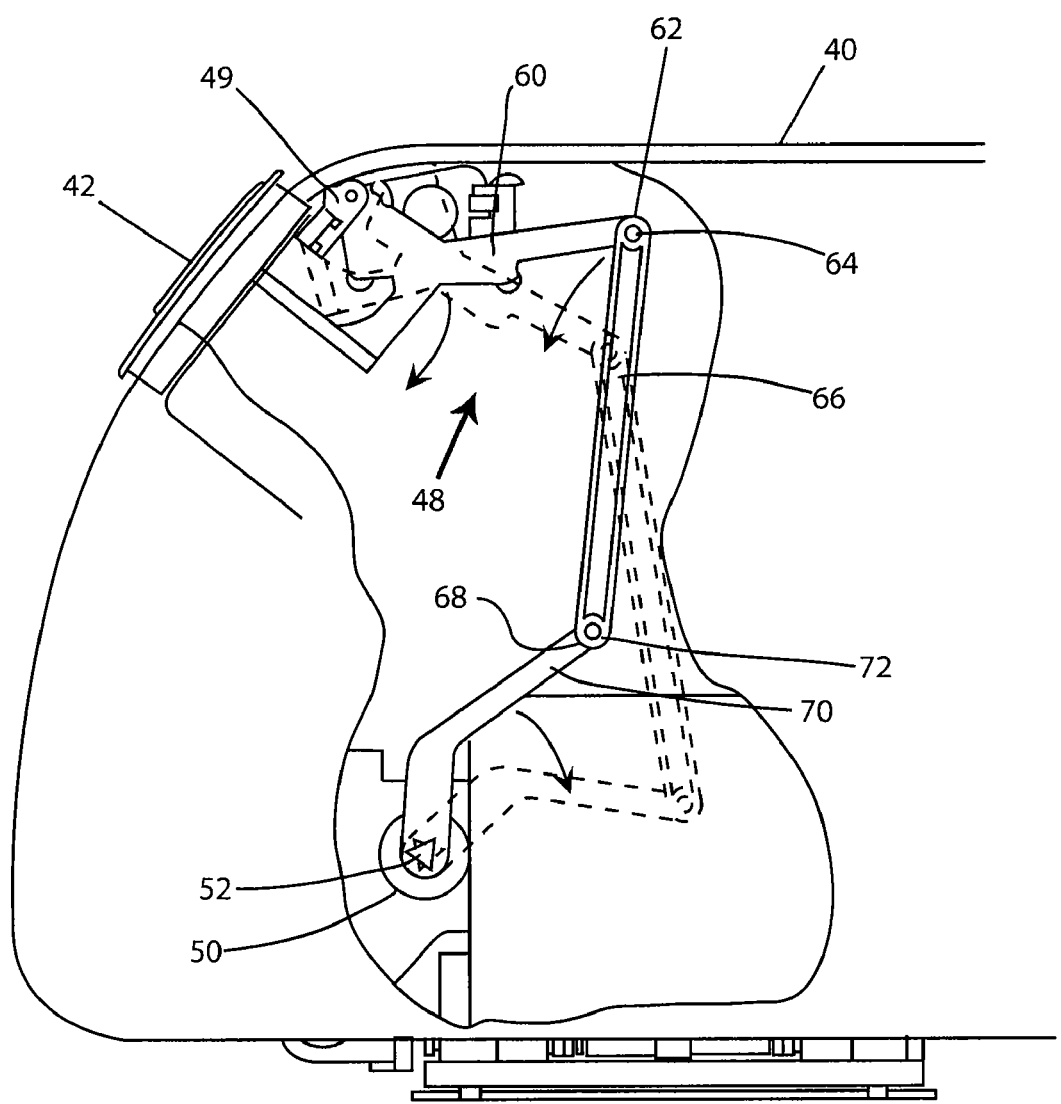
FIG. 4 is a right side partially cut-away view of an aircraft seat with the input transfer and disconnect mechanism of the present invention.
Figure 5:
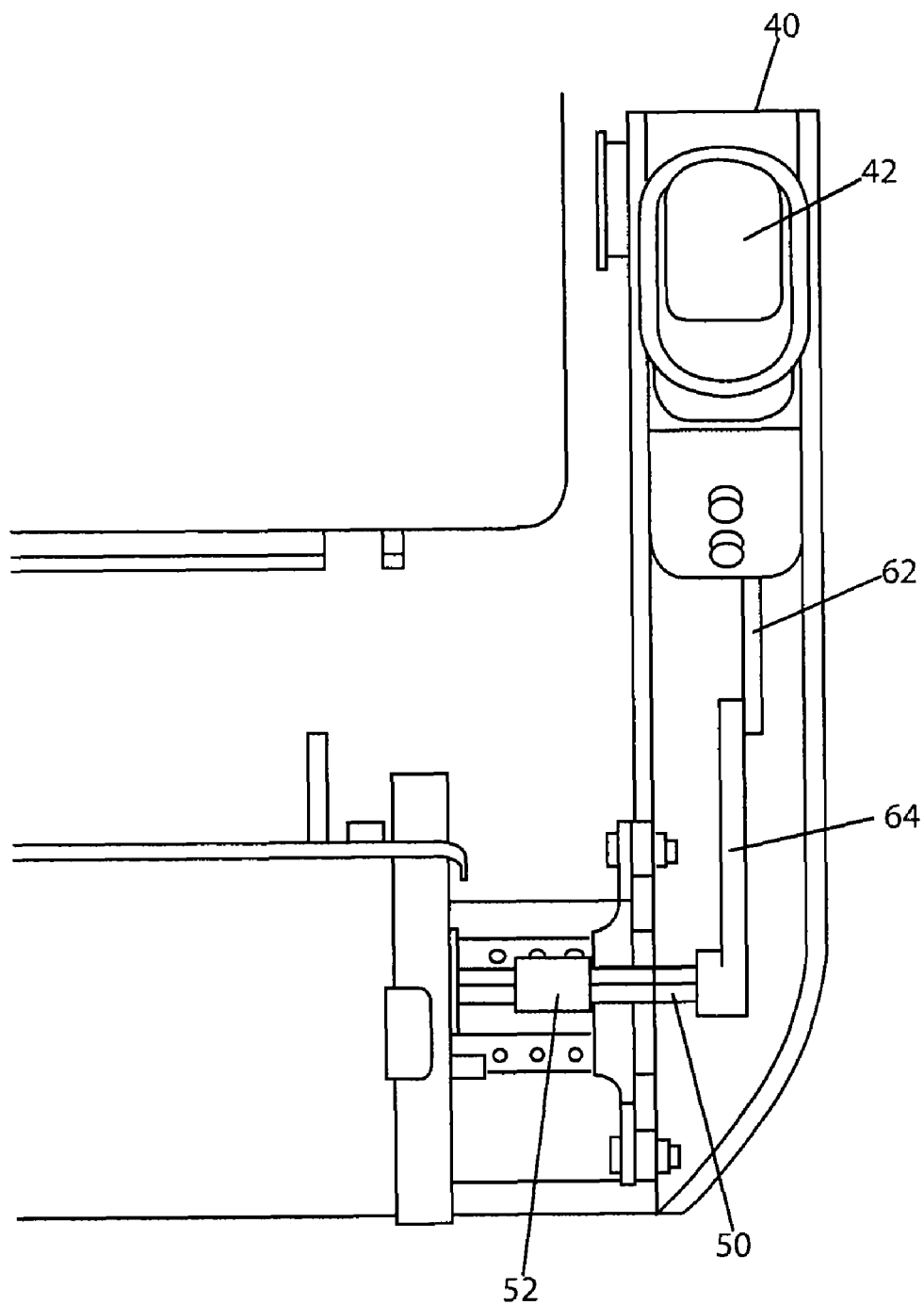
FIG. 5 is a partially cut-away front view of an aircraft seat with the input transfer and disconnect mechanism of the present invention.

FIGS. 3-5 illustrates the seat control 42 attached to a seat control attachment end 49 of a seat input transfer and disconnect mechanism 48. When the seat control 42 is actuated, it engages the seat input transfer and disconnect mechanism 48 and causes a receiver end 50 to rotate. The receiver end 50 is opposite the seat control attachment end 49. Inserted into the receiver end 50 is one end 54 of couple shaft 52 and the opposite end 56 engages either the seat translation and rotation mechanism 15 or a portion of the seat back mechanism 58, both of which can be located in the seat bottom frame 12. The rotation of receiver end 50 is transmitted via the couple shaft 52 to unlock the seat translation and rotation mechanism 15, freeing the seat to translate and rotate as described above.

In a separate embodiment, illustrated in FIG. 6, the rotation of receiver end 50 is transmitted via the couple shaft 52 to the seat back mechanism 58 to allow the seat back 22 to pivot.

The seat input transfer and disconnect mechanism 48 is a series of arms, pivots and springs, no cabling is used. In a particular embodiment, first control arm 60 has the seat control attachment end 49 and an opposing end 62 pivotally attached to a first end 64 of a second control arm 66. Second control arm 66 is also pivotally attached at its other end 68 to third control arm 70 at end 72. Third control arm end 72 is opposite the receiver end 50.

FIGS. 3 and 4 illustrate the seat input transfer and disconnect mechanism 48 in operation. When the seat control 42 is actuated, the first control arm 60 is pulled forward moving ends 62, 64 forward and down. This motion forces the second control arm 66 to move downwards as it pivots about the ends 62, 64. This in turn moves end 72 downward and causes receiver end 50 to rotate. This movement rotates couple shaft 52 to actuate either the seat translation and rotation mechanism 15 or the seat back mechanism 58. When the seat control 42 is released, all control arms 60, 66, and 70 return to the normal position.

Calibrating the lengths and angles of the first control arm 60, second control arm 66, and the third control arm 70 is important. User control of the seat input transfer and disconnect mechanism 48 must be such that the actuation of the seat control 42 is smooth. The amount of force required cannot be too "soft" or "loose" as to allow unintended actuation, but also not too "hard" or "tight" so a range of passengers, including children, can operate the seat control 42. This is also important for the embodiment, discussed below, wherein the seat control 42 has numerous positions.

While the use of the input transfer and disconnect mechanism 48 is counterintuitive since it increases the weight of the seat as opposed to the use cables, upon disassembly and reassembly, only the couple shaft 52 is disengaged. This allows all other components to remain aligned when the armrests 40 and seat 10 are upholstered.

Further, as discussed above, the seat input transfer and disconnect mechanism 48 can be used to move the seat in the translational and rotational movement and also to pivot the seat back. Each of these movements can be actuated separately, using two different mechanisms or can be linked to a single mechanism wherein all movements are available on actuation of the seat control.

In a further embodiment, the seat control 42 can have more than one position, each position relating to a different position of the seat input transfer and disconnect mechanism 48 wherein each position unlocks a separate and distinct seat movement. In one embodiment, a first position can unlock the transitional and rotational movement, while a second position locks the transitional and rotational movement and unlocks the seat back pivoting movement. Further, there can be at least three positions, wherein each position unlocks a particular movement and locks the remaining movements. Furthermore, seat control positions can lock and unlock either the front-to-back or side-to-side movements separately and different positions can also control the amount of rotation of the seat. For example, one position can allow only 120° of rotation and another position allows the full 360° of rotation.

The use of the seat input transfer and disconnect mechanism 48 also allows the width of the seat to be adjusted without re-cabling the entire system. As illustrated in FIGS. 7A and 7B, during assembly, the armrests 40 can be attached to the seat bottom frame 12 using bracket 100. The bracket 100 has a series of evenly spaced bracket holes 102. The bracket 100 is inserted into a seat frame slot 106 that can support the armrest 40. Over the seat frame slot is a seat frame hole 104. One bracket hole 102 is aligned with the seat frame hole 104 and then pinned through to affix the armrest 40 to the seat bottom frame 12. Depending on which bracket hole 102 is used, determines the width of the seat base 20 by determining how far or close the armrests 40 are to the seat bottom frame 12. Once the proper width is chosen, all that is required is a properly sized couple shaft 52 to link the seat input transfer and disconnect mechanism 48 with one or both of the seat translation and rotation mechanism 15 and the seat back mechanism 58.

This allows both armrests 40 and the seat translation and rotation mechanism 15 and/or the seat back mechanism 58 to be assembled separately and engaged in the final stages of assembly. Further, manufacturing errors or changes in the seat width specifications can be easily accommodated.

What is claimed is:

1. An aircraft seat comprising:
   a seat bottom frame having a side;
   a seat translation and rotation mechanism attached to the seat bottom frame allowing at least one of translation and rotational movement of the seat bottom frame;
   at least one armrest removably attached to the side of the seat bottom frame, the armrest comprising:
   a seat control mounted to an outside of the armrest;
   at least one armrest bracket disposed on the armrest, wherein the armrest bracket has a plurality of bracket holes;
   a seat frame slot extending through the seat bottom frame from a first side of the seat bottom frame to a second side of the seat bottom frame, the seat frame slot configured to receive the armrest bracket, wherein the seat frame slot has a seat frame hole; and
   a fastener engaging the armrest bracket and the seat bottom frame by passing consecutively through the seat frame hole and one of the plurality of bracket holes to attach the armrest to the seat bottom frame,
   wherein the bracket holes are separately alignable with the seat frame hole and each bracket hole determines a different distance from the armrest to the seat bottom, and
   wherein the fastener is a pin.

2. The aircraft seat of claim 1, wherein the distance determines the width of a seat base disposed on the seat bottom frame.

3. An aircraft seat comprising:
   a seat bottom frame having a side;
   a seat translation and rotation mechanism attached to the seat bottom frame allowing at
   least one of translation and rotational movement of the seat bottom frame;
   at least one armrest removably attached to the side of the seat bottom frame, the armrest comprising:
   a seat control mounted to an outside of the armrest;
   at least two armrest brackets disposed on the armrest, wherein each armrest bracket has a plurality of bracket holes;
   at least two seat frame slots each extending through the seat bottom frame from a first side of the seat bottom frame to a second side of the seat bottom frame, each configured to receive one of the armrest brackets, wherein each seat frame slot has at least one seat frame hole; and
   at least one fastener engaging each of the armrest brackets and the seat bottom frame by passing consecutively through the seat frame hole and one of the plurality of bracket holes to attach the armrest to the seat bottom frame
   wherein the bracket holes are separately alignable with the seat frame hole and each bracket hole determines a different distance from the armrest to the seat bottom, and
   wherein the fastener is a pin.

4. The aircraft seat of claim 3, wherein the distance determines the width of a seat base disposed on the seat bottom frame.

* * * * *